July 26, 1927.
H. W. TOBEY
1,637,031
ELECTRIC WELDING
Filed Aug. 10, 1923
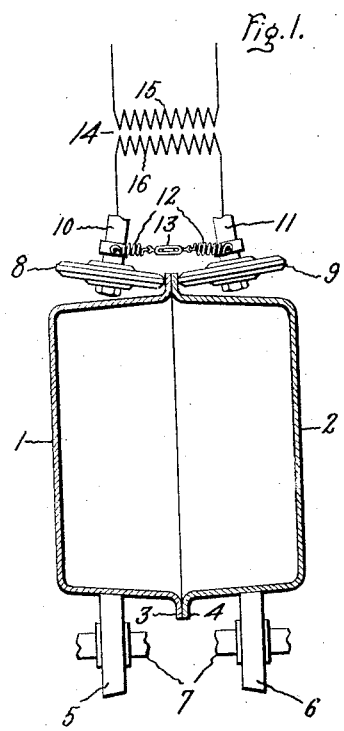
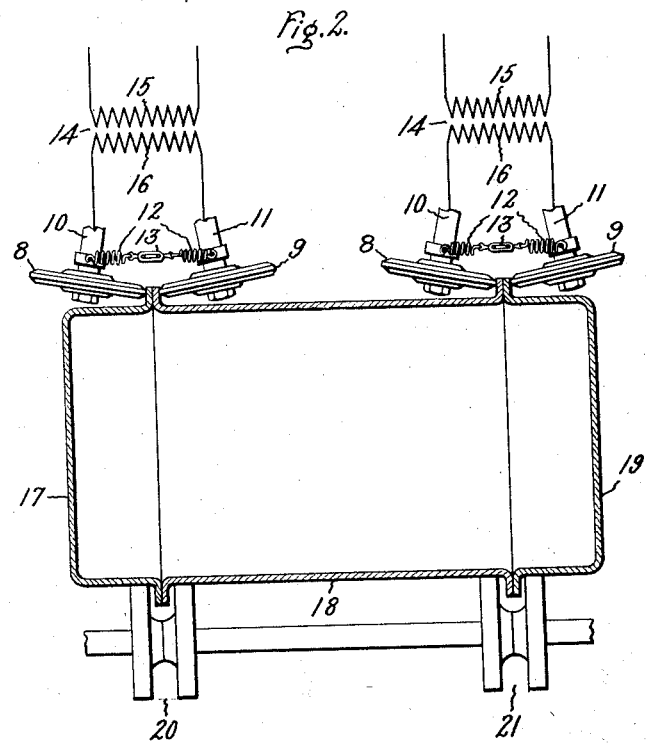
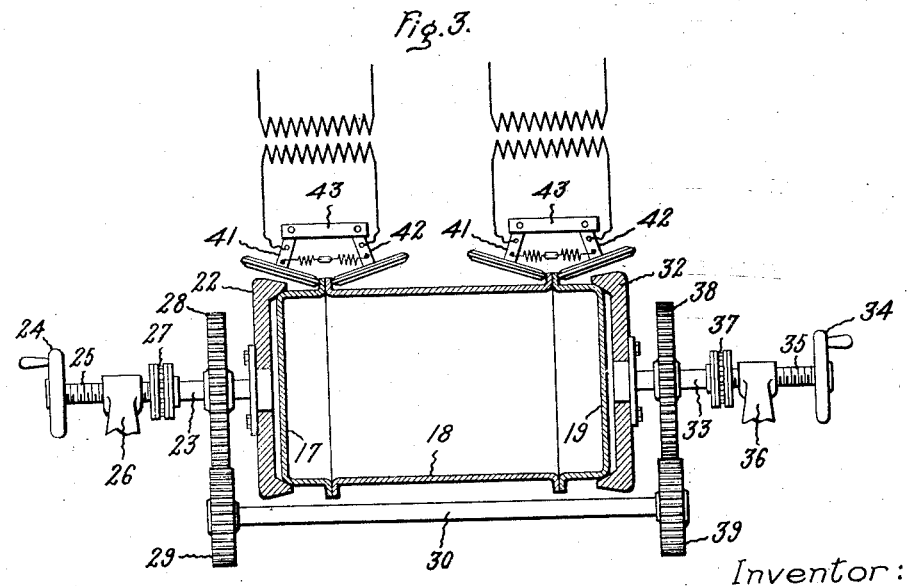
Inventor:
Harry W. Tobey,
by [signature]
His Attorney.

Patented July 26, 1927.

1,637,031

UNITED STATES PATENT OFFICE.

HARRY W. TOBEY, OF PITTSFIELD, MASSACHUSETTS, ASSIGNOR TO GENERAL ELECTRIC COMPANY, A CORPORATION OF NEW YORK.

ELECTRIC WELDING.

Application filed August 10, 1923. Serial No. 656,730.

My invention relates to the welding of circumferential seams such as are encountered in the manufacture of metal barrels, drums, tanks, and other like metallic articles, and has for one of its objects the provision of a method of welding by which the parts or edges to be welded are not subjected to a pressure tending to force them out of alignment with each other and by which the necessity of a mandrel or other support for the seam during the welding operation is avoided. A further object is to provide a holding means which are simple and reliable for maintaining the parts to be welded in a position to facilitate the welding operation. In accordance with my invention the parts to be joined are formed with flanges at their meeting ends and these flanges are welded together by compressing them between rotatable electrodes and passing a welding current between the electrodes across the joint between the flanges while producing relative movement between the electrodes and the work.

My invention will be better understood when considered in connection with the accompanying drawing and its scope will be pointed out by the appended claim.

Referring now to the drawing, Fig. 1 shows the application of my invention to the welding of a vessel or container comprising two sections or parts; Fig. 2 shows its application to a vessel comprising three sections; and Fig. 3 shows an arrangement for holding and rotating the work during the welding operation.

Fig. 1 shows a vessel formed of sections 1 and 2 provided with flanges 3 and 4 respectively on their adjacent ends and rotatably supported upon the rolls 5 and 6 mounted on the shaft 7. Suitable electrodes 8 and 9, either one or both of which may be driven in any well known manner to cause rotation of the vessel, are arranged to rotate about the axes of shafts 10 and 11 respectively and to receive between them the raised seam formed by the flanges 3 and 4. These electrodes are biased toward each other by means of springs 12 the tension of which may be adjusted by suitable means, illustrated as a turnbuckle 13, and which are provided for the purpose of holding the electrodes 8 and 9 in contact with the opposite sides of the raised seam formed by the flanges and compressing these flanges into intimate contact with each other. These springs may be insulated from the shafts 10 and 11 in any convenient manner. Current for welding the joint between the flanges 3 and 4 may be supplied through a transformer 14 having its primary winding 15 connected to any suitable source of power and having the terminals of its secondary winding 16 conductively associated with the electrodes 8 and 9.

Fig. 2 illustrates the manner of welding a vessel comprising heads 17 and 19 and an intermediate section 18. In this case, as in the previous one, flanges are formed on the adjacent ends of the different sections and adjacent pairs of flanges are welded together by passing them between pairs of rotatable electrodes in all respects similar to that described in connection with Fig. 1. The vessel in this case is rotatably supported upon rolls 20 and 21 and is rotated by driving one or both electrodes of each pair in any convenient manner. After the seams have been welded, channel shaped hoops or bands may be placed over them to present a smooth surface for the barrel to roll on. This protection is not necessary to prevent failure of the seam but serves to prevent turning over of its edges. These hoops are customarily applied to vessels having ribs rolled around the body. The ends of the hoops or bands may be welded together.

Fig. 3 illustrates a different means for supporting and rotating the vessel shown in Fig. 2. At the left end of the vessel is shown a rotating and clamping mechanism comprising a clamping member 22 mounted to rotate with the stub shaft 23 and arranged to be moved in a longitudinal direction by means of handwheel 24 fixed to a threaded rod 25 arranged to cooperate with a threaded stationary member 26 and connected wtih the shaft 23 through a thrust bearing 27. A gear 28 mounted on the shaft 23 is arranged to mesh with a gear 29 mounted on the shaft 30 which may be provided with any suitable driving means for rotating the work. Also driven by the shaft 30 and mounted at the right hand end of the vessel is a clamping and rotating mechanism similar to that described and comprising clamping member 32, stub shaft 33, handwheel 34, screw 35, stationary member 36, thrust bearing 37 and gears 38 and 39. The pairs of electrodes shown in Fig. 3 are similar to those previously described except that in this case each electrode is mounted to revolve about the shaft on which it is mounted. The shafts of each pair are supported and spaced apart by an insulating member 43. The springs by which the shafts 41 and 42 are biased toward each other are in all respects similar to those described in connection with Fig. 1.

In the operation of the apparatus shown in Fig. 3, the various sections of the vessel having been tacked together in any suitable manner, as by arc welding for example, are placed between the members 22 and 32 and the handwheels 24 and 34 are adjusted to clamp the ends of the sections together in a position suitable for operation of the electrodes, a certain amount of longitudinal adjustment being faciiltated by making gears 29 and 39 somewhat wider than the gears 28 and 38 with which they cooperate. The shaft 30 may then be set in motion and current applied to form the weld as the vessel is rotated. Under these conditions the fact that the shafts of the rotatable electrodes are substantially radial to the axis of the vessel is of special advantage in that substantially no radial component of pressure exists and a mandrel support on the side of the seam opposite the electrodes is unnecessary.

While I have described the principle of my invention, together wtih the apparatus which I now consider to represent the best embodiment thereof, I desire to have it understood that the apparatus is only illustrative and that the invention can be carried out by other means.

What I claim as new, and desire to secure by Letters Patent of the United States, is:—

A machine for welding together sections of a metallic vessel flanged at their meeting edges, comprising a pair of shafts having their adjacent ends spaced apart, a pair of vessel supporting members one on each of said adjacent ends, a pair of rotatable electrodes arranged to contact with opposite sides of the raised seam formed by said flanges and to roll along said flanges in response to rotation of said vessel by said supporting members, and means for moving said supporting members to clamp the sections of said vessel together and to aline said seams with said electrodes.

In witness whereof, I have hereunto set my hand this 4th day of August, 1923.

HARRY W. TOBEY.